United States Patent [19]

Miller et al.

[11] Patent Number: 4,813,979

[45] Date of Patent: Mar. 21, 1989

[54] SECONDARY OXYGEN PURIFIER FOR MOLECULAR SIEVE OXYGEN CONCENTRATOR

[75] Inventors: George W. Miller; Clarence F. Theis, both of San Antonio, Tex.

[73] Assignee: The United States of America as represented by the Secretary of the Air Force, Washington, D.C.

[21] Appl. No.: 151,383

[22] Filed: Feb. 2, 1988

[51] Int. Cl.$^4$ .............................................. B01D 53/04
[52] U.S. Cl. .......................................... 55/25; 55/68; 55/75; 55/162; 55/179; 55/389
[58] Field of Search ................... 55/18, 20, 21, 25, 26, 55/58, 62, 66, 68, 75, 161–163, 179, 389

[56] References Cited

U.S. PATENT DOCUMENTS

| | | | |
|---|---|---|---|
| 4,190,424 | 2/1980 | Armond et al. | 55/58 |
| 4,194,891 | 3/1980 | Earls et al. | 55/62 X |
| 4,194,892 | 3/1980 | Jones et al. | 55/68 X |
| 4,272,265 | 6/1981 | Snyder | 55/389 |
| 4,386,945 | 6/1983 | Gardner | 55/68 X |
| 4,448,592 | 5/1984 | Linde | 55/68 |
| 4,482,362 | 11/1984 | Yamazaki et al. | 55/68 X |
| 4,519,813 | 5/1985 | Hagiwara et al. | 55/68 X |
| 4,529,412 | 7/1985 | Hayashi et al. | 55/68 X |
| 4,561,287 | 12/1985 | Rowland | 73/23 |
| 4,566,881 | 1/1986 | Richter et al. | 55/25 |
| 4,614,525 | 9/1986 | Reiss | 55/25 |
| 4,627,857 | 12/1986 | Sutt, Jr. | 55/70 |
| 4,629,476 | 12/1986 | Sutt, Jr. | 55/68 |
| 4,648,888 | 3/1987 | Rowland | 55/21 |
| 4,661,124 | 4/1987 | Hamlin et al. | 55/21 |
| 4,661,125 | 4/1987 | Haruna et al. | 55/68 X |
| 4,681,099 | 7/1987 | Sato et al. | 128/204.23 |
| 4,681,602 | 7/1987 | Glenn et al. | 55/21 |
| 4,744,803 | 5/1988 | Knaebel | 55/68 X |
| 4,756,723 | 7/1988 | Sircar | 55/68 X |

Primary Examiner—Robert Spitzer
Attorney, Agent, or Firm—Bernard E. Franz; Donald J. Singer

[57] ABSTRACT

The secondary purifier, composed of two cylindrical adsorbent beds and valving, is used to increase the oxygen concentration of the product gas comprising oxygen and argon from a zeolite molecular sieve concentrator. The oxygen purity of the gas is increased by selectively adsorbing and exhausting the argon component by the use of beds of small particle size (16×40 mesh) carbon molecular sieve. In a two step cycle, during step 1 of the cycle one bed receives high pressure 30 PSIA feed gas which pressurizes the bed and establishes a product oxygen flow, and the argon component of the air is removed by preferential adsorption in the carbon molecular sieve. Simultaneously, the high pressure gas in the other bed is vented to a lower pressure usually the ambient surroundings, and this depressurization serves to desorb the argon previously adsorbed during the high pressure phase of the cycle. In step 2 of the cycle the adsorbent beds exchange roles. This constant cycling results in a continuous product stream of very high purity oxygen (up to 99.6%). The separation is conducted at a temperature of 297° K. The secondary purifier does not require a regenerative purge flow for efficient operation, which minimizes the feed gas consumption.

8 Claims, 3 Drawing Sheets

SECONDARY OXYGEN PURIFIER FOR MOLECULAR SIEVE OXYGEN CONCENTRATOR

RIGHTS OF THE GOVERNMENT

The invention described herein may be manufactured and used by or for the Government of the United States for all governmental purposes without the payment of any royalty.

BACKGROUND OF THE INVENTION

The present invention relates to a secondary oxygen purifier for a molecular sieve oxygen concentrator.

Molecular sieve oxygen concentrators have attracted considerable attention recently because they are capable of producing high purity oxygen (about 95%) in a simple, cost-effective manner. Further, this oxygen has been found acceptable as a breathing gas for patients requiring oxygen therapy and for aircrew hypoxia protection. These concentrators operate on the principle of rapid pressure swing adsorption (RPSA), whereby, the pressure of the adsorbent beds is cycled at a typical rate of 10 sec/cycle. This rapid cycling improves the oxygen-nitrogen separation efficiency of the concentrator resulting in a significant reduction in the unit's weight and volume. During this cycling the nitrogen component of the air is adsorbed at high pressure and desorbed at low pressure to the surroundings. Concentrators operating on this principle are present onboard the USAF B1-B strategic bomber and the USN AV-8B fighter.

The simplest oxygen concentrator is composed of two cylindrical adsorbent beds containing a zeolite molecular sieve, valving, and an orifice. In a typical two-step cycle, during step 1 of the cycle one bed receives high pressure (20-40 PSIG) feed air which pressurizes the bed and establishes a product oxygen flow, and the nitrogen component of the air is removed by preferential adsorption in the zeolite molecular sieve. Simultaneously, the high pressure gas in the other bed is vented to a lower pressure usually the ambient surroundings, and this depressurization serves to desorb the nitrogen previously adsorbed during the high pressure phase of the cycle. Also, a portion of the product gas from the high pressure bed is fed to the low pressure bed to flush the nitrogen-rich gas from that bed. The orifice serves to control the flow of purge gas. In step 2 of the cycle the adsorbent beds exchange roles. This constant cycling results in a continuous product stream of high purity oxygen.

One limitation of a concentrator containing a zeolite molecular sieve is the maximum oxygen purity of 95% (the remainder is argon). Because the oxygen and argon molecules are similar in size and are nonpolar they both are concentrated upon passage through the beds of zeolite molecular sieve.

U.S. patents of interest include U.S. Pat. No. 4,566,881 to Richter et al which discloses a process and apparatus for producing oxygen with a low fraction of argon from air involving a first adsorption unit comprising at least two adsorbers containing carbon molecular sieve which provides an intermediate product that is enriched with oxygen and depleted of argon by comparison to the supplied $N_2/O_2/Ar$ gas mixture. Thereafter the intermediate product is subjected to zeolite adsorption in an adsorption unit. This patent discloses that when the method is carried out with a dry and carbon-dioxide-free air, oxygen is produced with a purity of 99.7 volume percent during the adsorption phase of the zeolite adsorption unit. This patent further discloses that the regeneration of the zeolite-bed adsorbers is interrupted while the first of carbon-bed adsorbers are regenerated by a vacuum pump which is used in common to regenerate the adsorbers. Similarly U.S. Pat. No. 4,190,424 to Armond et al discloses integrating the zeolite and carbon sieve processes to produce oxygen with a purity better than that which can be achieved by either of the known processes operated alone. The overall performance of this process is enhanced by the recycling as feedstock of an oxygen-rich gas stream from the second section to the first. A product stream with a proportion of oxygen as high as 99.7% is cited for one embodiment (see col 3, line 37). In another embodiment, air is provided as feedstock to the zeolite sieve section as also is an oxygen rich gas stream obtained during a feed step in the carbon sieve section. The zeolite sieve section gives a product containing approximately 90% oxygen with 5% nitrogen and 5% argon which is passed as feedstock to the carbon sieve section (see col 3, line 50 et seq.) U.S. Pat. Nos. 4,627,857 and 4,629,476 to Sutt, Jr. are directed to processes for preparation and use of carbon molecular sieves, with a pore size in U.S. Pat. No. 4,627,857 patent of about 3 to about 20 Angstroms, preferably 4 to 10 Angstroms. Other patents relating to oxygen generators or concentrators which rely on molecular sieves include U.S. Pat. Nos. 4,681,602 to Glenn et al, 4,681,099 to Sato et al, 4,661,124 to Hamlin et al, 4,648,888 and 4,561,527 to Rowland, 4,614,525 to Reiss, and 4,272,265 to Snyder; and of these Glenn et al, Hamline et al and Snyder cite aircraft applicability.

SUMMARY OF THE INVENTION

An objective of the invention is to increase the oxygen concentration of the product gas from a zeolite molecular sieve oxygen concentrator.

The oxygen purity of the gas is increased by selectively adsorbing and exhausting the argon component by the use of beds of small particle size (16×40 mesh) carbon molecular sieve. The mesh size corresponds to a particle size of 1.2 to 0.42 mm. This invention will improve the present molecular sieve oxygen concentrators for field hospitals and portable oxygen therapy. The two adsorbent beds are operatively connected to six solenoid actuated valves, one manual valve and a programmable solenoid actuator. The system according to the invention does not require a regenerative purge flow for efficient operation. This feature minimizes the feed gas consumption.

The primary use of the invention would be as a secondary oxygen purifier for molecular sieve oxygen concentrators supplying oxygen therapy.

DETAILED DESCRIPTION

Figure 1:
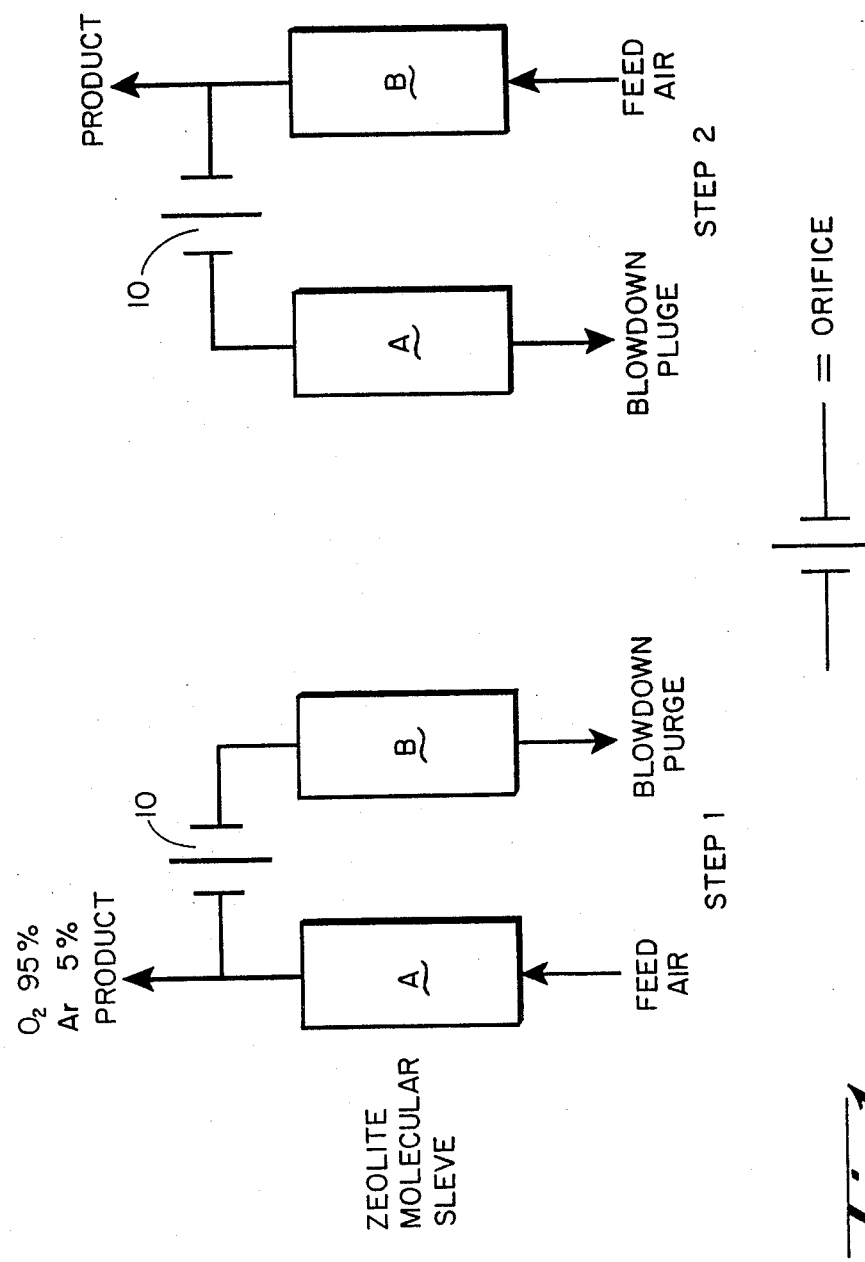
FIG. 1 is symbolic diagram showing a typical prior art two-step cycle for a molecular sieve oxygen concentrator.

As shown in FIG. 1, the simplest typical prior art oxygen concentrator is composed of two cylindrical adsorbent beds containing a zeolite molecular sieve, valving (not shown), and an orifice 10; and operates in a two-step cycle. During step 1 of the cycle bed A receives high pressure (20-40 PSIG) feed air which pressurizes the bed and establishes a product oxygen flow. The nitrogen component of the air is removed by preferential adsorption in the zeolite molecular sieve. Simultaneously, the high pressure gas in bed B is vented to a lower pressure usually the ambient surroundings. This depressurization of bed B serves to desorb the nitrogen previously adsorbed during the high pressure phase of the cycle. Also, a portion of the product gas from bed A is fed to bed B in countercurrent fashion to flush the nitrogenrich gas from the bed. The orifice serves to control the flow of purge gas. In step 2 of the cycle the adsorbent beds exchange roles. This constant cycling results in a continuous product stream of high purity oxygen (up to 95%).

Figure 2:
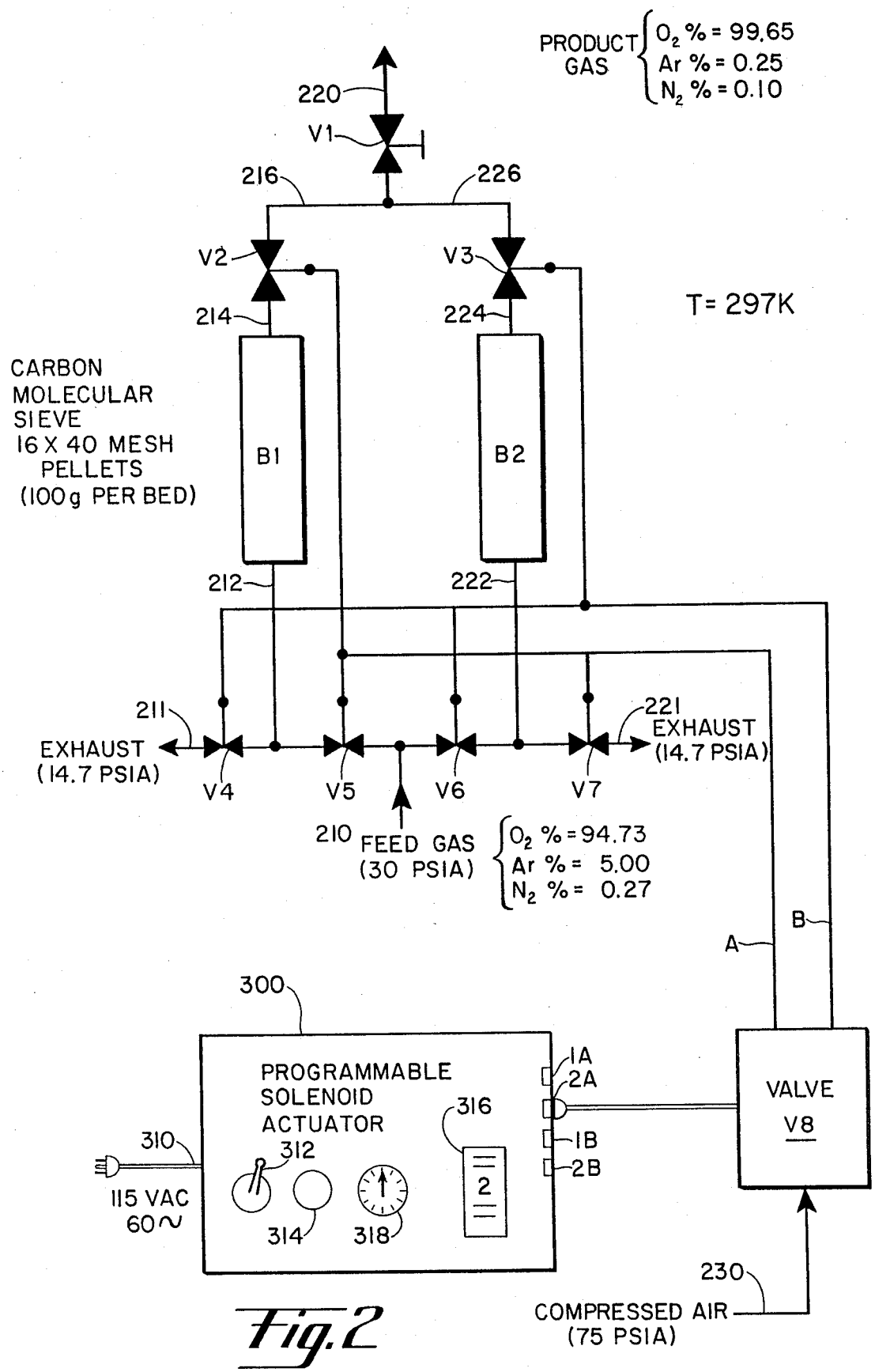
FIG. 2 is schematic diagram showing a secondary oxygen purifier for an aircraft molecular sieve oxygen generating system.

A schematic of a miniaturized version of the apparatus for practicing the invention is shown in FIG. 2. The apparatus is composed of two adsorbent beds B1 and B2 containing about 100 grams of 16×40 mesh carbon molecular sieve, one manual valve V1, six controlled valves V2–V7, and a programmable solenoid actuator unit 300. The mesh size corresponds to a particle size of 1.2 mm to 0.42 mm. Earlier experiments with 2.67 mm diameter pellets for the carbon molecular sieve or at an operational temperature of 203° K. gave unsatisfactory results.

The piping and valves comprise a feed gas line 210 connected to valves V5 and V6, exhaust lines 211 and 221 connected respectively to valves V4 and V7, a line 212 from the valves V4 and V5 to the bed B1, a line 222 from the valves V6 and V7 to the bed B2, a line 214 from bed B1 to valve V2, a line 224 from bed B2 to valve V3, a line 216 from valve V2 to valve V1, a line 226 from valve V3 to valve V1, and a line 220 from valve V1 for the product gas output.

Figure 3:
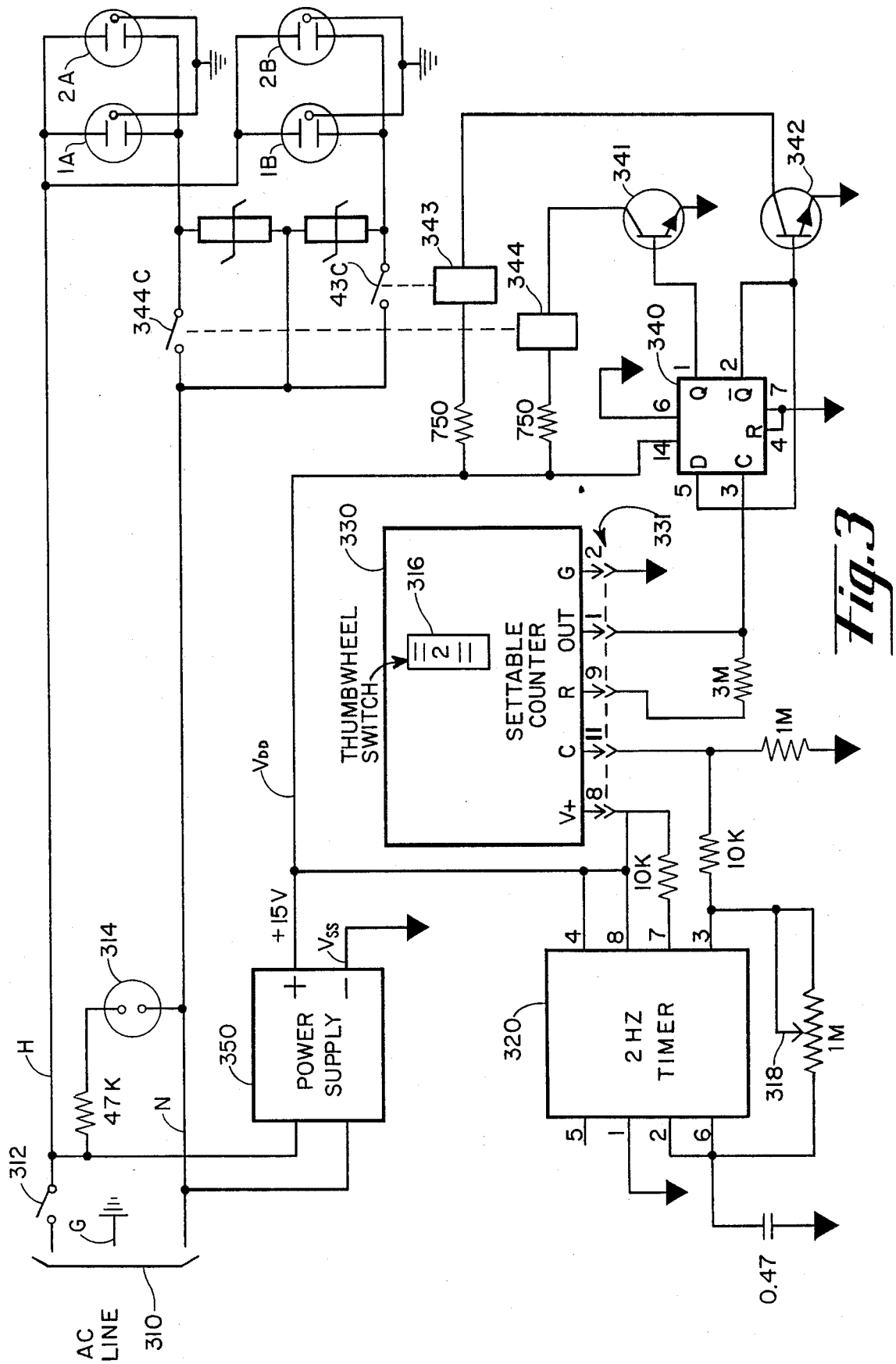
FIG. 3 is an electrical schematic and functional block diagram of a programmable solenoid actuator for the apparatus of FIG. 2.

A full scale model of the apparatus would require a greater quantity of carbon molecular sieve. A schematic electrical diagram of the programmable solenoid actuator is shown in FIG. 3. The adsorbent beds were constructed of one-ich stainless steel tubing 34.3 cm in length with an outer diameter of 2.54 cm and an inner diameter of 2.36 cm. The apparatus was operated at an optimum cycle time of 5.0 seconds, temperature of 297° K., an inlet pressure of 30 PSIA, and an exhaust pressure of 14.7 PSIA, with a feed gas composition of approximately 95% oxygen and 5% argon. The apparatus did not have a purge flow for regeneration of the adsorbent.

During operation, valve V1 is partially open, and the adsorbent beds B1 and B2 are alternately cycled through steps of adsorption and desorption. In the first half-cycle of operation, valves V2, V5, and V7 are activated open for a period of 2.5 seconds, while the valves V3, V4, and V6 are closed. High pressure feed gas enters bed B1 from line 210 via valve V5 and 212 to pressurize the bed and initiate the flow of product gas at the outlet port 220 via line 214, valve V2, line 216 and valve V1. As the feed gas passes through the adsorbent bed, argon is preferentially adsorbed and oxygen in the feed gas is concentrated. Simultaneously, bed B2 is depressurized to the ambient surroundings via line 222 and valve V7 and the argon adsorbed during the previous cycle is desorbed and exhausted from the apparatus. During the second half-cycle, valves V3, V4, and V5 are energized open for a period of 2.5 seconds, while the valves V2, V5, and V7 are closed. During this phase of the cycle bed B2 is pressurized from line 210 via valve V6 and line 222 and produces product gas from its outlet via line 224, valve V3, line 226 and valve V1; while bed B1 is depressurized via line 212 and valve V4. By repeating these steps of adsorption and desorption, a continuous stream of very high purity oxygen is produced. Additionally, it should be noted that a purge is not required for regeneration of the adsorbent beds during the depressurization phase of the cycle, as does the zeolite molecular sieve oxygen concentrator. This feature improves the efficiency by reducing the feed gas consumption.

The programmable solenoid actuator unit 300 provides the timing for controlling the operation of the valves V2–V7. The unit 300 is supplied with 115 volt AC power via a line 310. There are four female output receptacles, comprising a pair 1A and 2A in parallel, and another pair 1B and 2B in parallel. The AC power from line 310 is connected to the receptacles 1A and 2A during the first half-cycle of the bed operation, and to the receptacles 1B and 2B during the other half-cycle. There is a switch 312 for turning on the power, and a neon lamp 314 for indicating power on. "Programmable" refers to the timing being adjustable, as controlled by a thumbwheel switch 316 and potentiometer with a control 318. The unit 300 may be any apparatus which provides for programming of the operation of the valve V2–V7 in equal half cycles, with an adjustable cycle time.

In one embodiment of the secondary oxygen purifier comprising beds B1 and B2, the valves V1–V7 were solenoid actuated valves (Airmatic Model #20316). Power for operating the solenoids was supplied via electrical wiring with valves V2, V5 and V7 connected to the receptacles 1A and/or 2A, and the valves V3, V4 and V6 connected to the receptables 1B and/or 2B. The oxygen concentration of the product gas at the outlet 220 was 98.5%, with gas at the inlet 210 having approximately 95% oxygen and 5% argon. Originally purge flow was controlled using a Whitney #SS-OVM2 valve, but it was determined that the purge flow was not required.

In an improved embodiment, the solenoid actuated valves were replaced by air operated valves (Whitney Model #SS-92M4-NC) for the valves V2–V7 in FIG. 2. These are normally closed valves which are actuated open upon receiving an air pressure signal. Compressed air for operation of the valves V2–V7 is supplied via a solenoid operated valve V8 (Numatic Model MK-7 #11SAD4410). The solenoid is connected to receptacle 1A or 2A of the actuator 300. During one half cycle, the valve V8 is energized to supply compressed air at 75 PSIA from a line 230 to an air line A to actuate the valves V2, V5 and V7; and during the alternate half cycles, when the valve V8 is not energized, air from line 230 is supplied from line 230 and valve V8 via an air line B to actuate the valves V3, V4 and V6. The manual valve V1 may be Whitney Model #SS-21RS4-A. This improvement has resulted in a further increase in the oxygen concentration of the product gas at line 220.

In one test, bed B1 had 115.8 grams and bed B2 had 116.1 grams, for a total of 231.1 grams of the carbon molecular sieve, 16×40 mesh. The data were taken (with purge piping removed) with inlet gas calibrated at 94.73% $O_2$, 5.00% Ar and 0.27% $N_2$ at an inlet pressure of 30 PSIA (lbs./sq. inch abs.) and a temperature of 297 K. The product flow was 100 SCCM (Standard Cubic Centimeters Minute), and the cycle time was 5.00 seconds (2.5 seconds for each half cycle). The product gas at line 220 was 99.65% $O_2$, 0.25% Ar and 0.10% $N_2$.

A suitable programmable solenoid actuator unit 300 (originally designed by George Rex) is shown by a functional block and schematic diagram in FIG. 3. It includes a timer 320, a settable counter 330 and a flip flop 340, which may use CMOS MSI integrated circuit (IC) devices. The AC supply line 310 has a hot lead connected via the switch 312 to lead H, a neutral lead N, and a ground lead G connected to chassis ground. A neon light 314 in series with a 47K-ohm resistor between leads H and N indicates when the power is on. A 15-volt direct current power supply 350 (type 15E10) has its input connected to the AC leads H and N, and its output has + and − terminals connected respectively via leads $V_{DD}$ and $V_{SS}$ to the electronic devices.

The timer 320 may be a type ICM7555 IC device configured with an RC circuit as a free-running square-wave oscillator operating at a frequency of approximately two hertz. Lead $V_{DD}$ is connected to pins 4 and 8 and via a 10K-ohm resistor to pin 7. Lead $V_{SS}$ is connected to pin 1 and via a 47-microfarad capacitor to pins 2 and 6. Pins 2 and 6 are also connected via a 1M potentiometer to the output pin 3. The slider 318 of the potentiometer is used to vary the frequency. The output pin 3 is connected to a resistive voltage divider comprising a 10K-ohm resistor in series with a 1M-ohm resistor, with the junction of the resistors connected to the clock input of the settable counter module 330.

The counter module 330 is a Unimax Counter/Timer Decade Thumbwheel Switch model SR/SF-179, which has an MM74C90 4-bit decade counter CMOS IC device implemented on the switch, as well as a 47K-ohm pull-up resistor from an an output terminal 1 to terminal 8, and a 10K-ohm resistor between terminals 8 and 9. The device 330 has 12 terminals (only those connected being shown) connected to the circuit via a 14-pin ribbon wire connector 331. Terminals 8 and 2 are connected to the power leads $V_{DD}$ and $V_{SS}$, terminal 11 is the clock input, terminal 9 is a reset input connected via a 3M-ohm resistor to the output terminal 1. The module includes the thumbwheel switch 316, which has ten positions 0-9, and is shown in position 2. In operation, the module 330 counts the input clock pulses from terminal 11, and for every N input pulses, the output at terminal 1 supplies one output pulse, where N is the digit dialed on the thumbwheel switch. If the thumbwheel switch is set to the digit 0, the output remains at a high voltage level continuously and the circuit remains in a static state with no switching at the output occurring. All other selections of the thumbwheel switch (digits 1 through 9) will produce output pulses from the counter/timer module at the appropriate times. The output is also supplied back to the reset terminal 9 to reset the counter to the starting state after a count cycle has been completed.

The flip-flop 340 is one of the units of a dual D IC device type CD4013, connected to perform as a toggle (pin 2 connected to pin 5). Each time an output pulse from terminal 1 of the counter module 330 is applied to the clock input at pin 3 of the flip-flop 340, the signals at the two outputs at pins 1 and 2 will change states. The Q output is at pin 1, and the complement of Q at pin 2.

Relay driver transistors 341 and 342 (type 2N956) have their base inputs connected respectively to the outputs at pins 1 and 2 of the flip-flop 340, and their collector electrodes connected via the windings of relays 343 and 344 and respective 750-ohm resistors to the power supply lead $V_{DD}$, the emitters of the transistors being connected to the common lead $V_{SS}$. When the flip-flop 340 is in its "set" state, the transistor 341 is energized to operate the relay 344, which at its contacts 344C connects the AC power lead N to the outlet connectors 1A and 2A; and when the flip-flop 340 is in its "reset" state, the transistor 342 is energized to operate the relay 343, which at its contacts 343C connects the AC power lead N to the outlet connectors 1B and 2B. The hot lead H is directly connected to all four of the connectors 1A, 1B, 2A and 2B. During operation one relay is on when the other is off.

The timing for a typical setting of 2 hertz for the timer 320 and the thumbwheel switch set at "2", is a pulse produced by the timer 320 each 0.5 sec., with the counter module 330 producing an output pulse for every two oscillator pulses, or one output pulse per second. Then each output cycle from the solenoid actuator 300 will be two seconds, with one second of power on at connectors 1A and 2A, and one second of power on at connectors 1B and 2B. Likewise, for a thumbwheel digit selection of "3", a counter output pulse will be produced every 1.5 seconds (0.5 seconds×3) for a total cycle of 3 seconds.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A process for producing oxygen with alow proportion of argon from a feed gas which is approximately 95% oxygen and 5% argon, using first and second beds containing 16×40 mesh carbon molecular sieve, operating by alternatively cycling said beds through steps of adsorption and desorption, each cycle having first and second half cycles, comprising:
   in each first half-cycle of operation passing said feed gas under pressure through the first bed to pressurize the bed and provide a flow of product gas at an outlet port to preferentially adsorb argon and concentrate oxygen, while simultaneously the second bed is depressurized and the argon adsorbed during the previous cycle is desorbed and exhausted;
   and in each second half-cycle of operation passing said feed gas under pressure through the second bed to pressurize the bed and provide a flow of product gas at the outlet port to preferentially adsorb argon and concentrate oxygen, while simultaneously the first bed is depressurized and the argon adsorbed during the previous cycle is desorbed and exhausted;
   whereby by repeating these steps of adsorption and desorption, a continuous stream of oxygen is produced having a purity substantially greater than that of the feed gas (up to 99.6%).

2. A process according to claim 1,
   in which there is no purge for regeneration of the adsorbent beds during the depressurization phase of the cycle, whereby the efficiency is improved by reducing the feed gas consumption;

wherein the pressure of the feed gas is in the range of 25 to 70 PSIA;

the temperature is 297° K.;

the exhaust is to the ambient pressure; and the full cycle time (two half cycles) is in the range of 3 to 9 seconds.

3. A process according to claim 1, wherein the beds at one end are alternately coupled to a feed gas source or to ambient via air operated valves, and at the other end alternately to a product gas outlet via air operated valves, and the process includes selectively operating said valves so that in the first half cycle the first bed is connected to the feed gas source and to the product gas outlet, while the second bed is connected to ambient; and in the second half cycle the second bed is connected to the feed gas source and to the product gas outlet, while the first bed is connected to ambient.

4. A process according to claim 3, in which there is no purge for regeneration of the adsorbent beds during the depressurization phase of the cycle, whereby the efficiency is improved by reducing the feed gas consumption;

wherein the pressure of the feed gas is in the range of 25 to 70 PSIA;

the temperature is 297° K.;

the exhaust is to the ambient pressure; and the full cycle time (two half cycles) is in the range of 3 to 9 seconds.

5. An apparatus for producing oxygen with a low proportion of argon from a feed gas which is approximately 95% oxygen and 5% argon, comprising:

first and second beds containing 16×40 mesh carbon molecular sieve, each bed having a first end and a second end, an inlet port coupled to a source of feed gas under pressure, an outlet port for product gas, an exhaust port which is at a substantially lower pressure than the inlet port;

a first set of valves comprising a first inlet valve coupling the inlet port to the first end of the first bed, a first outlet valve coupling the second end of the first bed to the outlet port, and a first exhaust valve coupling the first end of the second bed to the exhaust port;

a second set of valves comprising a second inlet valve coupling the inlet port to the first end of the second bed, a second outlet valve coupling the second end of the second bed to the outlet port, and a second exhaust valve coupling the first end of the first bed to the exhaust port;

timing means for controlling operation of said valves in recurring cycles having equal first and second half cycles, with actuation means effective during the first half cycle to actuate the first set of valves open with the second set of valves closed, the actuation means being effective during the second half cycle to actuate the second set of valves open with the first set of valves closed;

so that in each first half-cycle of operation said feed gas passes under pressure through the first bed to pressurize the bed and provide a flow of product gas at the outlet port to preferentially adsorb argon and concentrate oxygen, while simultaneously the second bed is depressurized and the argon adsorbed during the previous cycle is desorbed and exhausted;

and in each second half-cycle of operation said feed gas passes under pressure through the second bed to pressurize the bed and provide a flow of product gas at the outlet port to preferentially adsorb argon and concentrate oxygen, while simultaneously the first bed is depressurized and the argon adsorbed during the previous cycle is desorbed and exhausted;

whereby by cyclically repeating the operation of adsorption and desorption, a continuous stream of oxygen is produced having a purity substantially greater than that of the feed gas (up to 99.6%).

6. Apparatus according to claim 5, in which there is no purge means for regeneration of the adsorbent beds during the depressurization phase of the cycle, whereby the efficiency is improved by reducing the feed gas consumption;

wherein the pressure of the feed gas is in the range of 25 to 70 PSIA;

the temperature is 297° K.;

the exhaust is to the ambient pressure; and the timing means has its full cycle time (two half cycles) in the range of 3 to 9 seconds.

7. Apparatus according to claim 5, wherein said valves of the first and second sets are air operated valves, and the actuation means comprises a solenoid actuated valve having an inlet coupled to a source of air under pressure, and having two outlets coupled respectively to first and second valve control lines, the first valve control line being coupled to actuation means of each of said valves of the first set, the second valve control line being coupled to actuation means of each of said valves of the second set, said solenoid actuated valve having a solenoid coupled to the timing means to be actuated during the first half cycle to supply air from said source to the first valve control line to actuate the valves of the first set, and during the second half cycle to supply air from said source to the second valve control line to actuate the valves of the second set.

8. Apparatus according to claim 7, in which there is no purge means for regeneration of the adsorbent beds during the depressurization pahse of the cycle, whereby the efficiency is improved by reducing the feed gas consumption;

wherein the pressure of the feed gas is in the range of 25 to 70 PSIA;

the temperature is 297° K.;

the exhaust is to the ambient pressure; and the timing means has its full cycle time (two half cycles) in the range of 3 to 9 seconds.

* * * * *